United States Patent [19]

Bibayan

[11] Patent Number: 5,922,054
[45] Date of Patent: Jul. 13, 1999

[54] SYSTEM FOR MANAGING EXTERNAL APPLICATIONS AND FILES

[75] Inventor: Farzad Bibayan, Irvine, Calif.

[73] Assignee: Canon Kabushiki Kaisha, Tokyo, Japan

[21] Appl. No.: 08/293,373

[22] Filed: Aug. 19, 1994

[51] Int. Cl.⁶ .................................................. G06F 9/46
[52] U.S. Cl. ........................................ 709/302; 707/205
[58] Field of Search .................................. 395/700, 680, 395/682; 707/205

[56] References Cited

U.S. PATENT DOCUMENTS

| | | | |
|---|---|---|---|
| 5,369,778 | 11/1994 | San Soucie et al. | 395/800 |
| 5,485,617 | 1/1996 | Stutz et al. | 395/700 |
| 5,499,333 | 3/1996 | Doudnikoff et al. | 395/153 |
| 5,506,983 | 4/1996 | Atkinson et al. | 395/600 |
| 5,511,197 | 4/1996 | Hill et al. | 395/700 |
| 5,517,645 | 5/1996 | Stutz et al. | 395/700 |

FOREIGN PATENT DOCUMENTS 304072  2/1989  European Pat. Off. .

OTHER PUBLICATIONS

Petzold, Charles, Windows 3.1 —Hello to TrueType, OLE, and Easier DDE;Farewell to Real Mode, Microsoft Systems Journal pp. 17–26, Sep. 1991.
Cowart Robert, "Mastering Windows 3.1", SYBEX, pp. 126–128, 1993.
Offermann, Karen, "Named Objects will add richness to OLE 2.0", Windows Sources, v1, N1, p26(1), Feb. 1993.
"Microsoft Windows Guide to Programming", Microsoft Press, 1990, pp. 2–1 to 2–6.
"Compound Document Protocol", Microsoft Press, 1991, pp. 26–31.
Fred Davis, "The Windows 3.1 Bible", Peachpit Press, 1993, Chapter 9, pp. 495–526.

"Conversationally Dependent Multiple Task Termination", IBM Technical Disclosure Bulletin, Vol. 32, No. 9B, Feb. 1990, pp. 80–81.

*Primary Examiner*—Majid A. Banankhah
*Assistant Examiner*—St. John Courtenay, III
*Attorney, Agent, or Firm*—Fitzpatrick, Cella, Harper & Scinto

[57] ABSTRACT

A computer-implemented system for managing an external application in response to a user's selection of an item in a compound document which is displayed by a client application. The managing system includes an application manager and a file manager which are simple in construction because there is no need for them to communicate directly with the external application; rather, they simply monitor the external application. In response to user selection of an item in the compound document, the client application copies the selected item to an external temporary file and sends the temporary file name to the application manager. Based on the file name, the application manager associates an external application to the file, launches the external application, issues polling requests for activity of the external application, and outputs the file name to the file manager. In response to outputting of the file name from the application manager, the file manager commences monitoring activities of the external file to determine whether it has been modified, and, in addition, returns a pointer for the external file to the application manager. The application manager returns the pointer for the external file to the client application, and in addition returns a pointer for the external application. Upon receipt of these pointers, the client application instructs a windowing operating system to display a window for the external application. By virtue of this arrangement, a full-featured compound document capability is provided in which it is possible to perform all conventional windowing tasks such as close down or re-focus of external applications, and close down or iconization of the client application, all without any specialized communication to the external application or the external file.

46 Claims, 11 Drawing Sheets

SYSTEM FOR MANAGING EXTERNAL APPLICATIONS AND FILES

BACKGROUND OF THE INVENTION

1. Field Of The Invention

The present invention is a computer-implemented management system which works in conjunction with a client application program so as to manage external application programs and their associated files. More particularly, the management system of the present invention provides a system for a client application to launch, track and otherwise manage an external application and its associated file.

2. Description Of The Related Art

It has recently become possible to create a computer document which contains data from a variety of different application programs Such a document is called a "compound document". Compound, documents are created by a first application program, usually called a "client application", and contain one or more data objects from other application programs. A compound document might, for example, be created by a word processing application program. In this case, the compound document contains not only text data native to the word processing application program, but also contains data objects from other application programs such as a bit map data object from a graphics display program, a spreadsheet data object from a spreadsheet program, or a sound data object from a sound recorder application program.

Compound documents are an important development in computer systems because they eliminate the constraint that data in a document must be that one single type of data supported by the client application. With compound documents, it is now possible to create a word processing document that includes not only text from the word processing application but which also includes numbers from a spreadsheet application, images from a graphics application, and sounds from a recorder application.

FIGS. 1(a) through 1(c) illustrate how a compound document might appear to a user of a client application program, here a client application program which allows a user to send and to receive multimedia messages which may include attachments from external application programs. A suitable client application program for sending and receiving multimedia messages is described in detail in application Ser. No. 07/808,757, filed Dec. 17, 1991, now abandoned, the contents of which are incorporated herein by reference.

In FIG. 1(a), a compound document 1 is shown as it might be displayed to a user on display screen 2 of computer monitor 3. Compound document 1 is a message that is scheduled to be sent to a remote recipient. The compound document includes a text portion 4 which is data native to the client message manager application program. In addition, compound document 1 includes attachments signified by icons 5, 6 and 7 which are data objects from external application programs. Specifically, text attachment 5 is a simple text file created by an external text editor application such as Microsoft Note Pad. Bitmap attachment 6 is a bitmap file created by an external graphics program such as Microsoft Paint Brush. Sound attachment 7 is a wave file created by an external sound application program such as Microsoft Sound Recorder.

By selecting one of the icons in compound document 1, such as by double clicking on the icon with a mouse, the user can cause the external application which created the data object to be launched so as to view, edit or otherwise modify the data object associated with the icon. Thus, as shown in FIG. 1(b), after selecting the bitmap icon 6, the external Paint Brush application program is launched so as to display the bitmap attachment. Likewise, in FIG. 1(c), the user has selected the remaining icons so as to cause associated external application programs to be launched.

Various implementations have been proposed so as to allow an external application to be launched from a client application which is displaying a compound document. For example, Microsoft has introduced object linking and embedding (hereinafter "OLE") which allows data objects from external applications to be linked or embedded in a compound document for a client application OLE is described in detail in Chapter 9 of F. Davis, "The Windows 3.1 Bible", Peachpit Press, 1993, the contents of which are incorporated herein by reference. OLE provides a robust implementation of compound documents which allows a user to launch external applications, to switch from one application to another, and to monitor how objects in the compound document are being modified by their respective external applications. However, to achieve this implementation, specialized communication is needed between the external application and the client application. For example, the external application must be OLE-aware and must register itself into a "registration database". The client application must, in addition, be OLE-compliant, meaning that the client application must be able to communicate directly or indirectly to the external applications so as to determine whether they are present must support the creation of complex compound documents, and must also conform to standard OLE interfaces.

Other implementations of compound documents have been proposed, but these implementations constrain how a user is able to manipulate data objects in the compound document. For example, "CC Mail" from Lotus, which is an E-mail client application, provides a compound document capability which is simpler than Microsoft's OLE but which does not provide as many features as OLE. For example, when an external application is launched from the "CC Mail" client application, a user is not permitted to access any other application program until the external application has been closed down. This limits the usefulness of compound documents. For example, when using the client "CC Mail" a application program, the user would not be able to obtain the display in FIG. 1(c). Rather, the user would be constrained to the display shown in FIG. 1(b) and would not be able to access any other program, including the client application program, until the Note Pad external application program had been closed down. Particularly in a windowing operating system such as Microsoft Windows, in which a user expects to be able to access any application program at any time, this is a significant limitation.

Accordingly, there is a need to provide a managing system for managing external applications associated with compound documents in which the management system provides a user with flexibility like that provided in an OLE-based implementation while at the same time does not require specialized communication between the client application program and the external application program.

SUMMARY OF THE INVENTION

The present invention addresses the aforementioned need in the art by providing a managing system which manages external applications that are launched from compound documents displayed in a client application without the need for specialized communication between the client application and the external applications.

In one aspect, the management system of the present invention includes an external application manager and an external file manager, both of which are instantiated by a client application program which supports compound documents. The external application manager determines which external application to launch based on characteristics in a file name provided from the client application, such as the DOS extension to the file name, launches the external application with the file, returns a pointer for the external application to the client application, periodically polls for activity of the external application, and outputs the file name to the external file manager. The external file manager monitors the file to determine if the file has been modified by the external application. Modification information is provided via the application manager back to the client application.

Because the external application manager simply monitors the external application (by polling), and the external file manager likewise only monitors the external file, there is no need for specialized communication between the client application and the external application. Moreover, because the external application is launched using a windowing operating system, the user is free to switch between any of the applications, including the client application. Thus, for example, if the external application is no longer in focus when the user re-selects the external data object from the client application display, the client-application simply refers to pointers returned from the application manager to determine whether there is an existing application program corresponding to the external object. If there is, then the client application requests application manager to put the external application in focus, and the application manager in turn asks the windowing operating system to activate the window of the external application so as to put the external application in focus. If there is no pointer, then the client application simply requests the application manager and file manager to launch a suitable external application.

Likewise, when an external application is closed down, the application manager which has been monitoring the activity of external applications advises the client application of this fact. The client application then decides based on the monitoring activities of the file manager whether it is necessary to re-import a file that has been modified by an external application.

In like manner, when the client application is closed down or iconized, the client application can easily determine whether there are any external applications by referring to the pointers returned by the application manager. If the client application is being closed down, then it can prompt the user to close down all external applications prior to closing down; as the external applications are closed, the client application can re-import any modified files as described previously. On the other hand, if the client application is being iconized, then the client application can sweep all external applications down into a single icon for the client application.

Accordingly, the invention as described above provides a full featured and robust implementation of compound documents which does not require a client application to communicate with external applications.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1A:
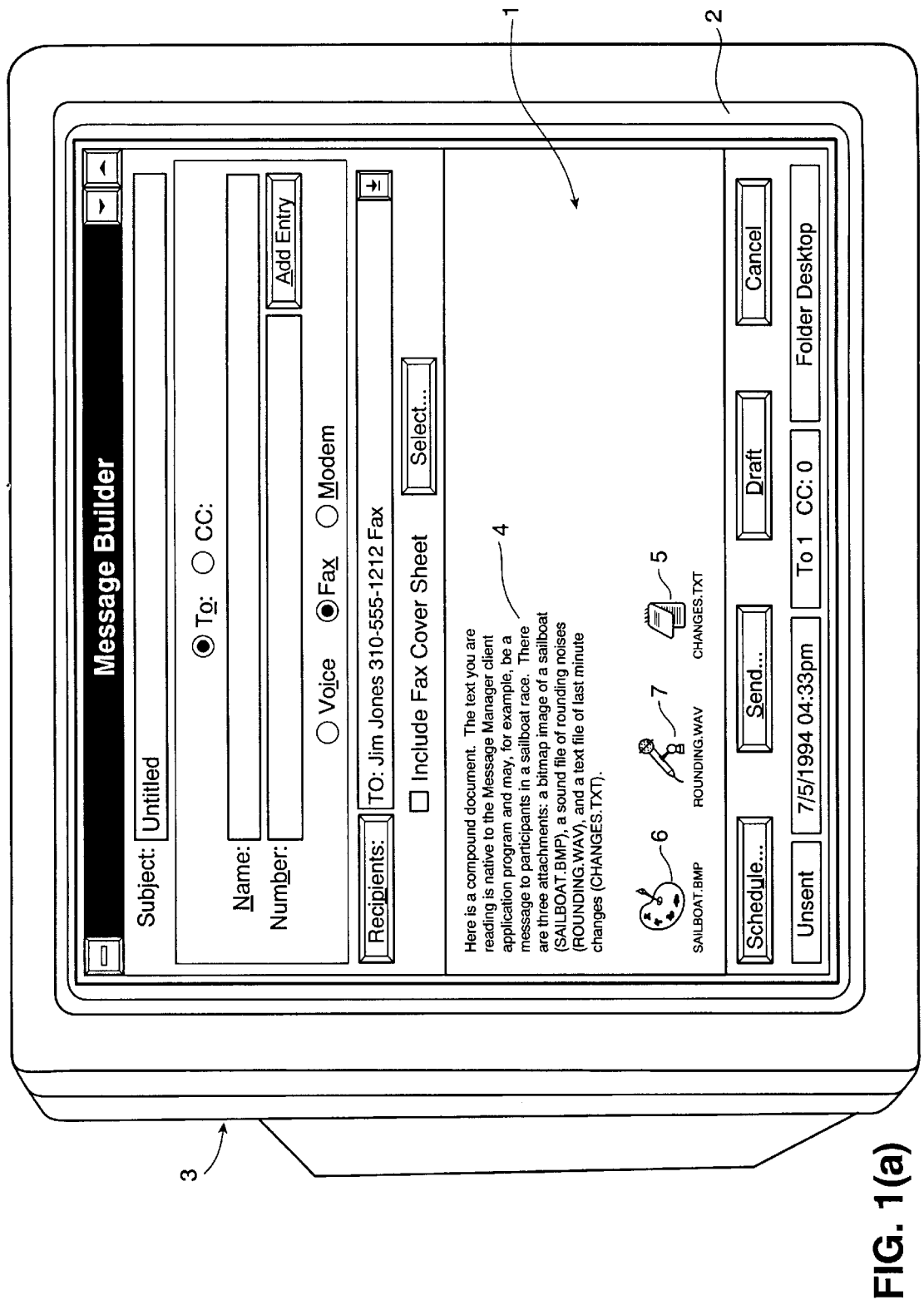
FIGS. 1(a), 1(b) and 1(c) illustrate how a compound document appears to a user of a client application program.
Figure 1B:
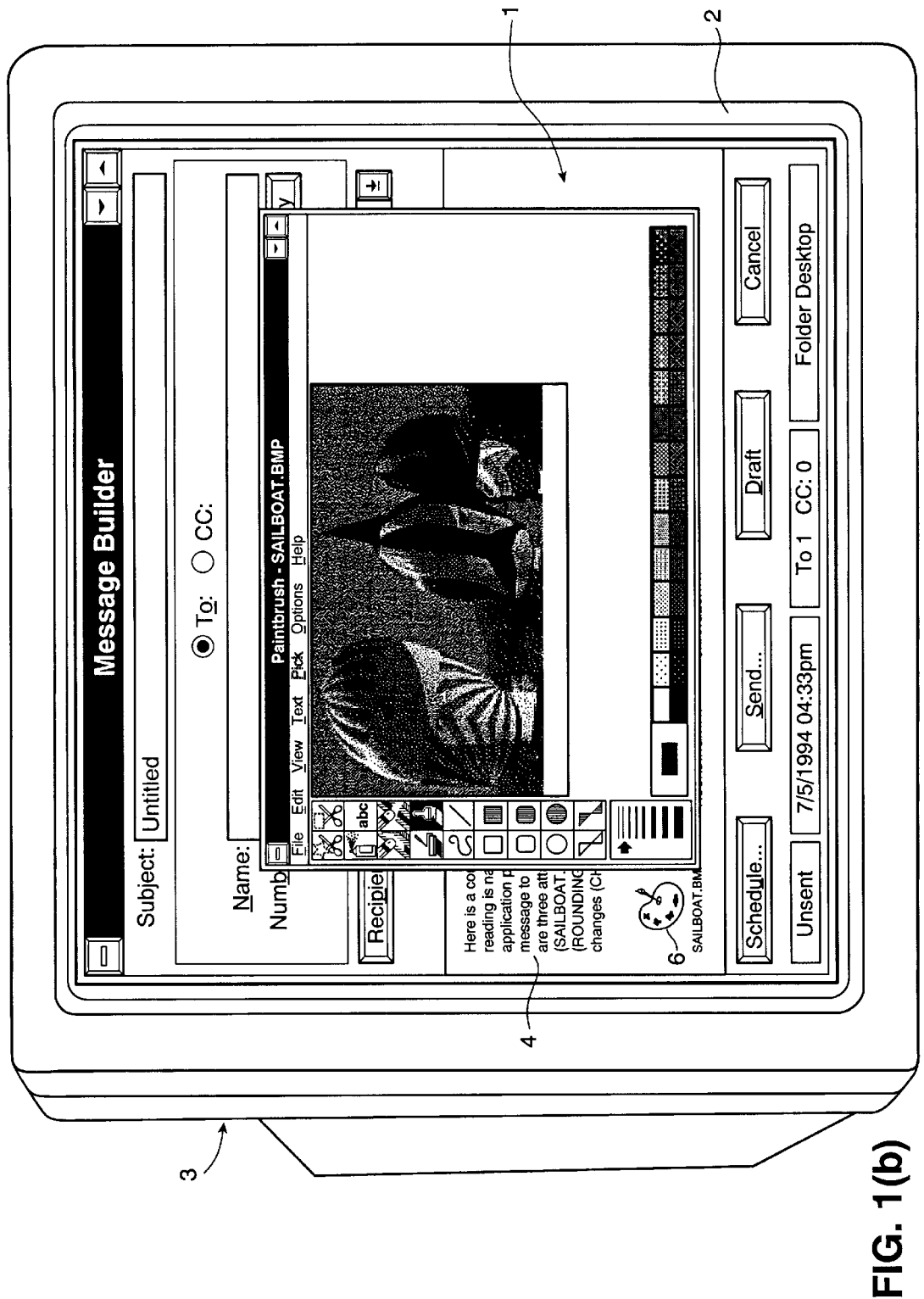
Figure 1C:
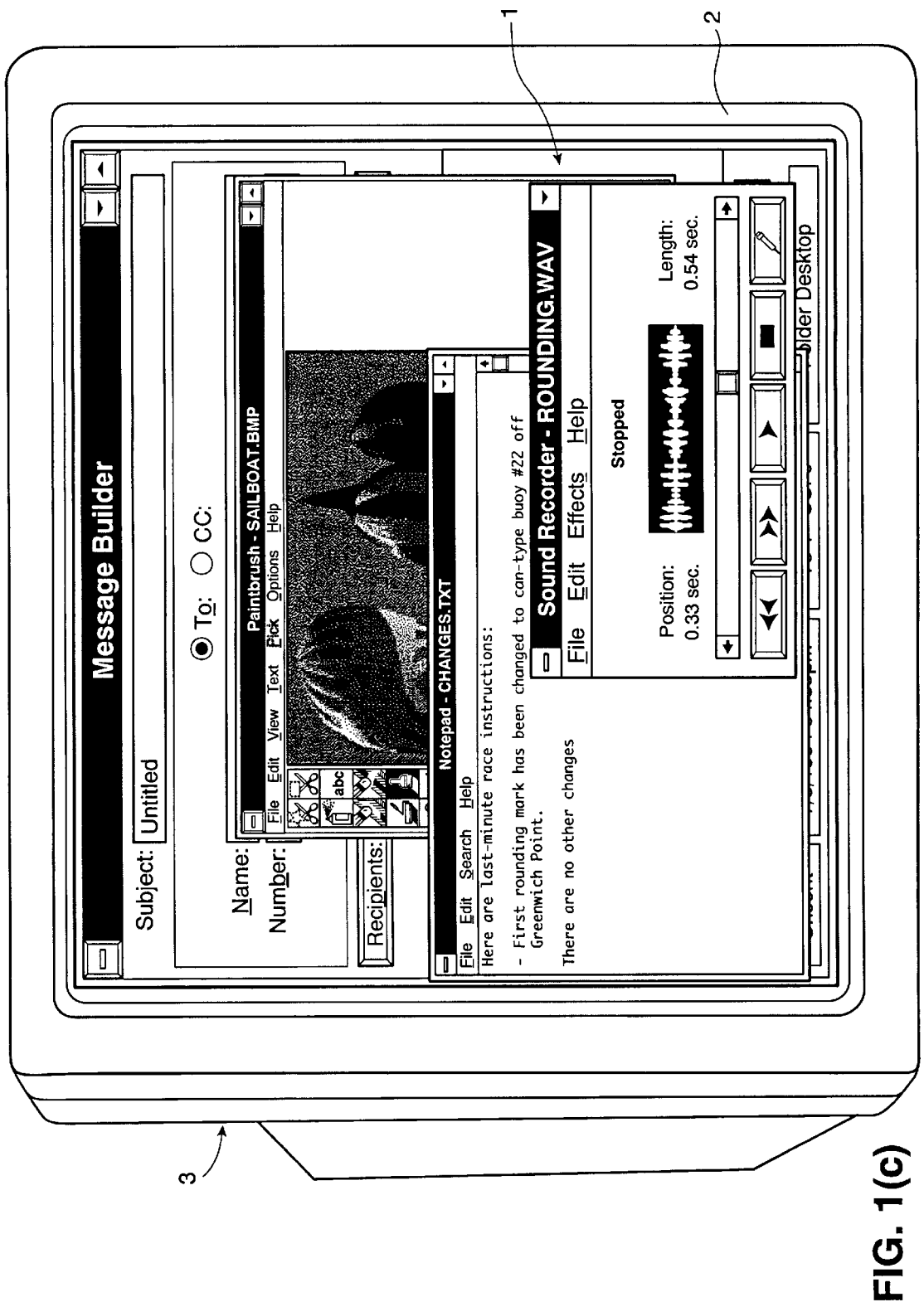
Figure 2:
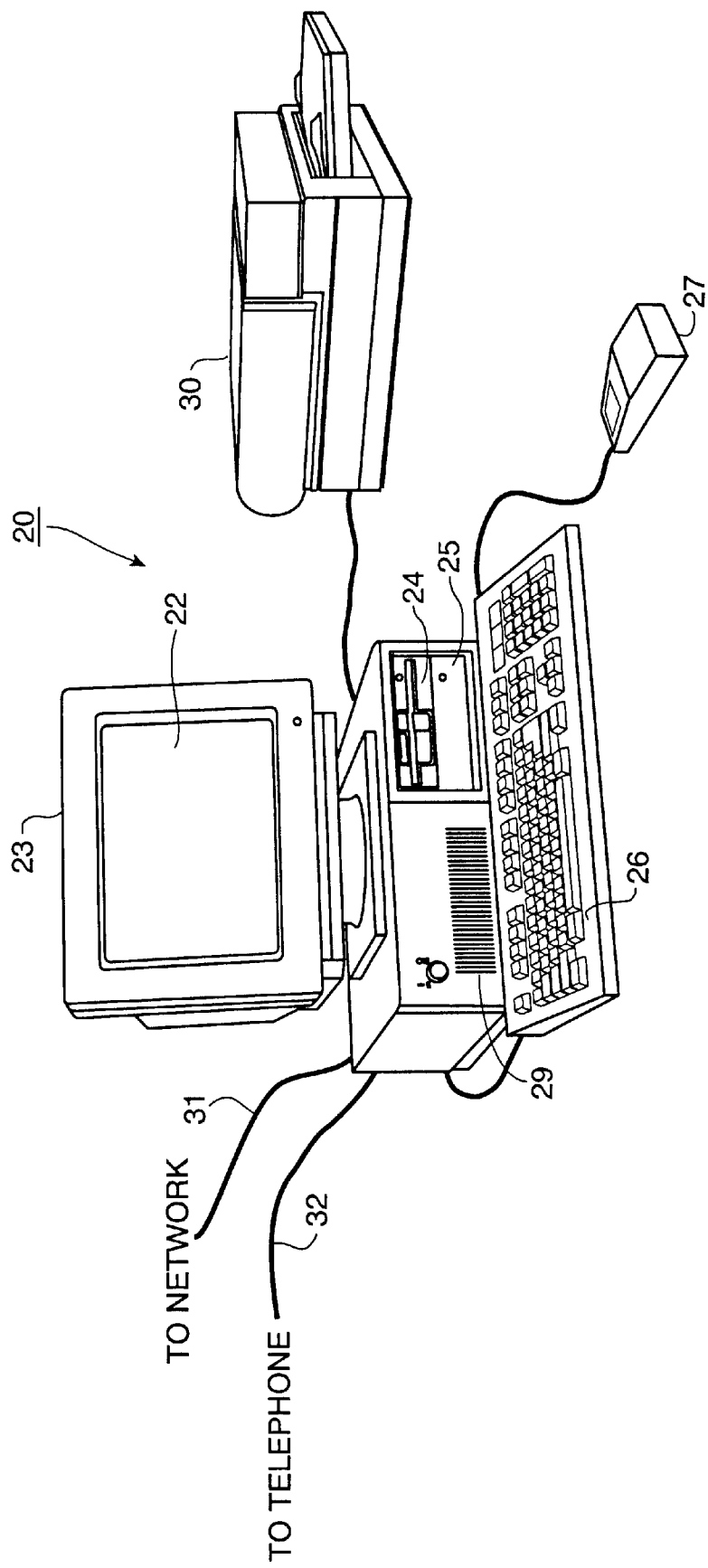
FIG. 2 is a view for showing the outward appearance of a representative embodiment of the present invention.

FIG. 2 is a view showing the outward appearance of a representative embodiment of the present invention. Shown in FIG. 2 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, a pointing device 27 such as a mouse or the like which is also provided to permit manipulation of objects on display screen 22, and a combined speaker/microphone 29. A conventional printer 30 as well as connections to a network 31 or to an ordinary voice telephone line 32 for sending and receiving voice and/or facsimile messages are also provided.

In accordance with operator instructions, and under control of the windowing operating system, stored application programs such as client application programs and external application programs are selectively activated to process and manipulate data.

Figure 3:
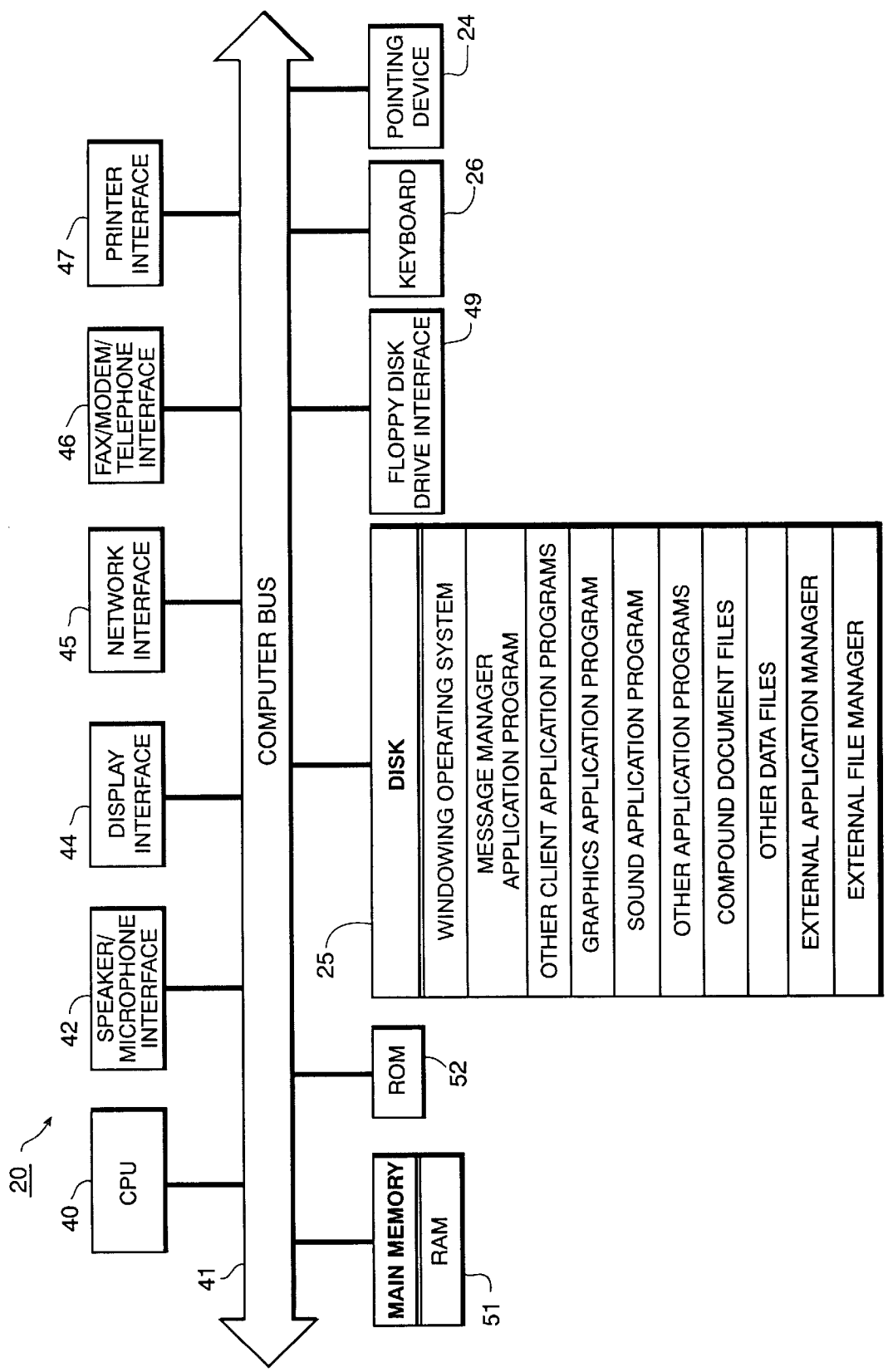
FIG. 3 is a detailed block diagram showing the internal construction of computing equipment shown in FIG. 2.

FIG. 3 is a detailed block diagram showing the internal construction of computing equipment 20. As shown in FIG. 3, computing equipment 20 includes a central processing unit (CPU) 40 such as programmable microprocessor interfaced to a computer bus 41. Also interfaced to computer bus 41 is speaker/microphone interface 42, display interface 44, network interface 45, fax/modem/telephone interface 46, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 3, and as previously mentioned, fixed disk 25 stores program instruction sequences for the windowing operating system and for various application programs such as a message manager application program, a graphics application program, a sound application program, and the like. In addition, stored on fixed disk 25 are compound document files together with other data files such as data files associated with the application programs. Fixed disk 25 also stores the management system of the present invention which, as shown in FIG. 3, is comprised by two components: an external application manager and an external file manager. Both components are instantiated by a client application that requires managing of external applications and their associated files. The structure of the external application and file managers is described in connection with FIG. 4, and its operation is described in the flow diagrams in FIGS. 5, 7 and 8.

Figure 4:
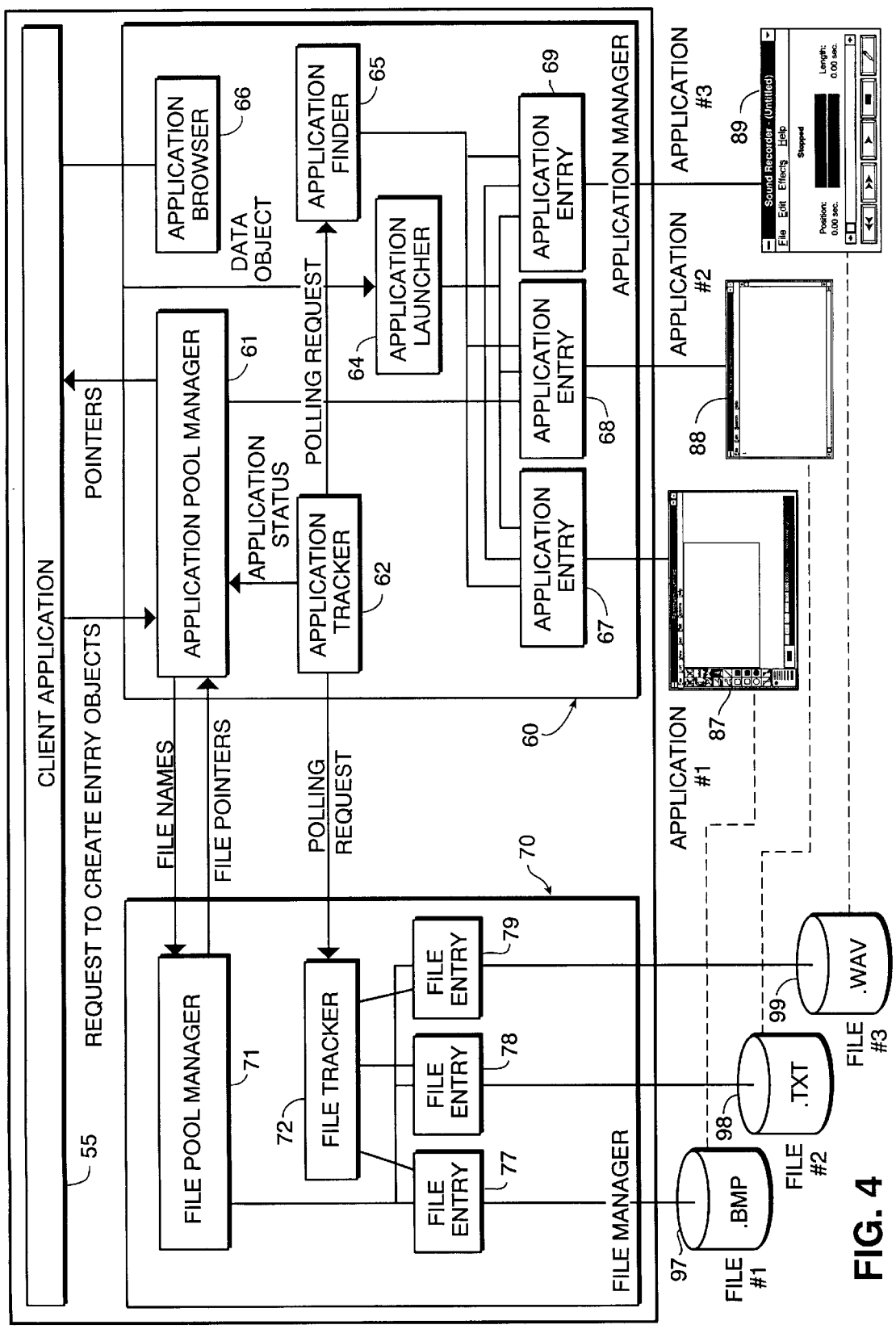
FIG. 4 is a block diagram showing the structure of the managing system of the present invention.

More particularly, FIG. 4 shows client application 55 with instantiations of application manager 60 and file manager 70. Application manager 60 includes application pool manager 61, application tracker 62, application launcher 64, application finder 65, and application browser 66. FIG. 4 shows application manager 60 as containing three application entry objects, namely objects 67, 68 and 69. As will be described more fully below, one such object is provided for each external application, such as applications 87, 88 and 89. It will therefore be understood that the provision of three application entry items is illustrative only, and that typically upon instantiation of application manager 60 there will not be any application entry objects until client application 55 requests application manager 60 to launch such an external application.

File manager 70 includes file pool manager 71, and file tracker 72. In addition, FIG. 4 shows file manager 70 as including three file entry objects, namely objects 77, 78 and 79, one each for each of external files such as files 97, 98 and 99. As before with respect to application entry objects 67, 68 and 69, one file entry object is provided for each external file. Thus, although FIG. 4 shows three such objects, upon instantiation of file manager 70 there will ordinarily not be any file entry objects.

The functional capabilities of each object shown in FIG. 4 will now be explained.

Application pool manager 61 is a holder for all application entry objects and has the capability of creating, adding, removing and managing those objects. Application pool manager 61 communicates with client application 55 by receiving requests from client application 55 to create entry objects and by sending to client application 55 pointers for application entry objects. Application pool manager 61 also communicates with file pool manager 71 by providing file pool manager 71 with file names and by receiving file pointers from file pool manager 71.

Application tracker 62 is responsible for checking for existence of all external applications and for synchronizing itself with the status of those external applications. As described more fully below, application tracker 62 operates on a periodic polling basis, namely by sending polling requests to application finder 65 and to file tracker 72. In situations where application finder 65 advises application tracker 62 that a particular external application no longer exists, application tracker 62 advises application pool manager 61 of the new application status. In that case, the application pool manager 61 removes the appropriate application entry object and, in turn, updates client application 55's list of pointers. File tracker 72 responds to polling requests from application tracker 62 by advising application tracker 62 of the status of external files, specifically whether such external files have been modified or not. In the event that external files have been modified, application tracker 62 advises application pool manager 61 of that fact and application pool manager 61, in turn, updates client application 55.

Application launcher 64 is used to launch an external application. Application launcher 64 communicates with client application 55 through receipt of a data object. Ordinarily, the data object is a file name received from client application 55 in response to user selection of a data object in a compound document. In that case, application launcher 64 determines whether there is an external application associated to the file name. If there is an external application associated with the file name application launcher 64 launches that application. To find associated applications, application launcher 64 issues requests to the windowing operating system for associated applications. If the windowing operating system cannot identify the application, application launcher 64 tries to identify an associated application through other means, such as searching through initialization (.INI) files. If an application is successfully launched, application launcher 64 advises client application 55 of a successful launch. Otherwise, application launcher 64 advises client application 55 that no application was launched.

Application browser 66 is invoked by client application 55 in the event that an external application cannot be associated to a data object provided to application launcher 64. If invoked, application browser 66 provides the user with a display of available application programs and permits the user to select one. If an application is selected, application browser 66 provides the selected application to client application 55 which, in turn, provides it to application launcher 64.

Application entry objects, such as objects 67, 68 and 69, contain all related information for applications such as the task handle for the application, the instance handle for the application, the window handle of the application, and the owner of the application (here, an item within client application 55). As mentioned above, one application entry object is provided for each external application.

Application finder 65 is responsible for finding previously-launched external applications and assuring that any external applications so found are actually present. In particular, because of timing delays and system overhead, it is possible to incorrectly conclude that an application is present when in fact it no longer exists. To assure that an external application is actually present, application finder 65 obtains the application window handle and the application task handle. Application finder 65 then matches the application instance handle in the application entry object against the application instance handle obtained from the window handle, and matches the application task handle in the application entry object against the application task handle obtained from the window handle. If both match, application finder 65 concludes that an application which the windowing operating system indicates is present is actually present, and advises application tracker 62 of that in response to polling requests.

File pool manager 71 holds all file entry objects and has the capability of creating, adding, removing and managing those objects. File pool managers 71 communicates with application pool manager 61 by receiving file names from application pool manager 61. In response to receipt of a file name, file pool manager 71 opens a file entry object, and returns a file pointer to the application pool manager.

File tracker 72 checks for existence of all files in the file pool and determines when a file has been modified. When it detects modification of a file, file tracker 72 advises application tracker 62 of that fact in response to a polling request.

File entry objects, such as objects 77, 78 and 79, contain all related information for a file such as the file name, a time stamp and possible persistent storage identifiers. As mentioned above, file pool manager 71 creates only one file entry object for each file.

By virtue of the above-described structure of application manager 60 and file manager 70, it will be appreciated that a full-featured external application and file management system has been provided which does not need to communicate with any external application or any external file. Rather, to provide full management of external applications and files, the application manager and file manager need only check pointers and handles provided by the windowing operating system.

Figure 5A:
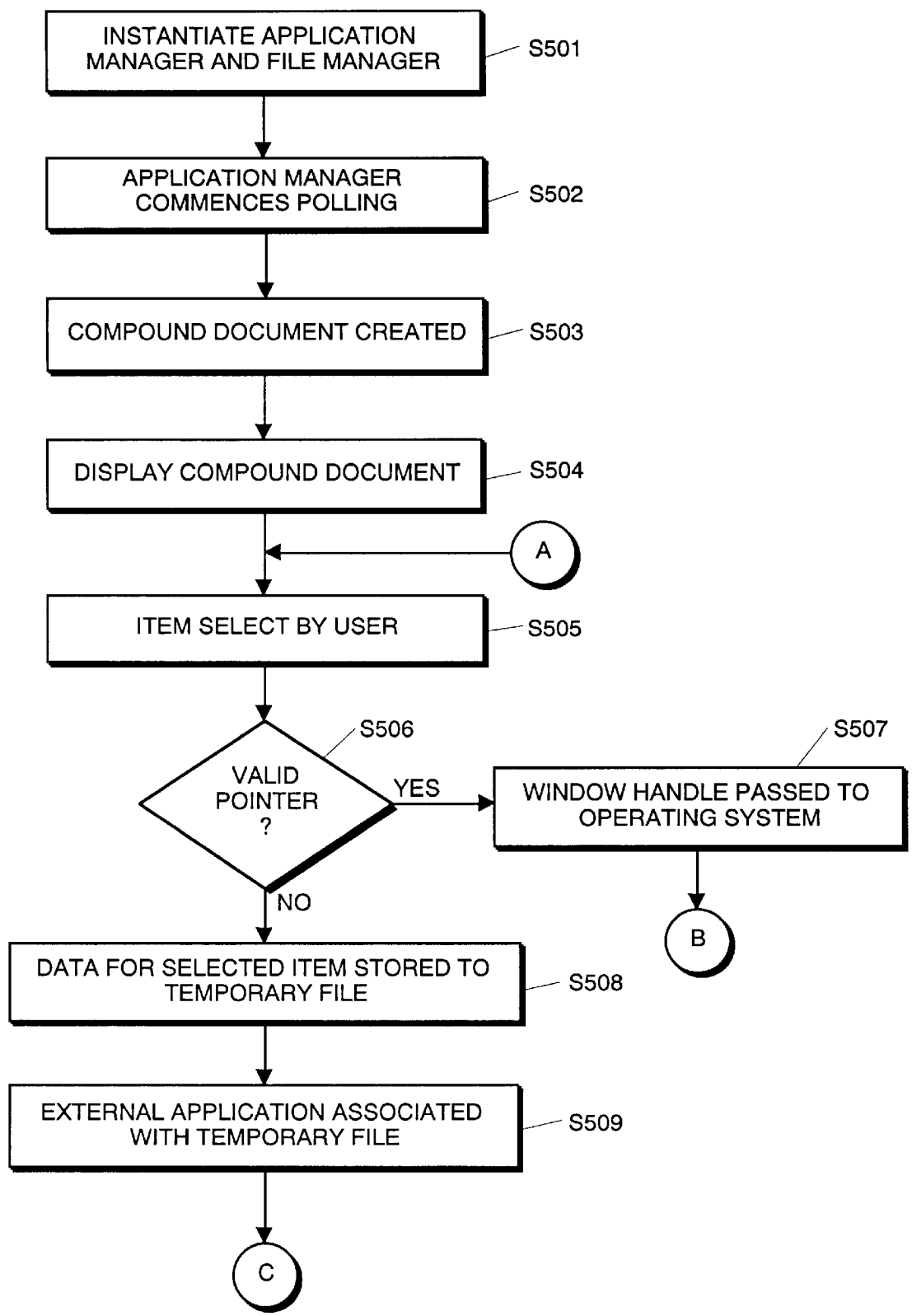
FIGS. 5(a), 5(b) are flow diagrams illustrating operation of the managing system shown in FIG. 4.
Figure 5B:
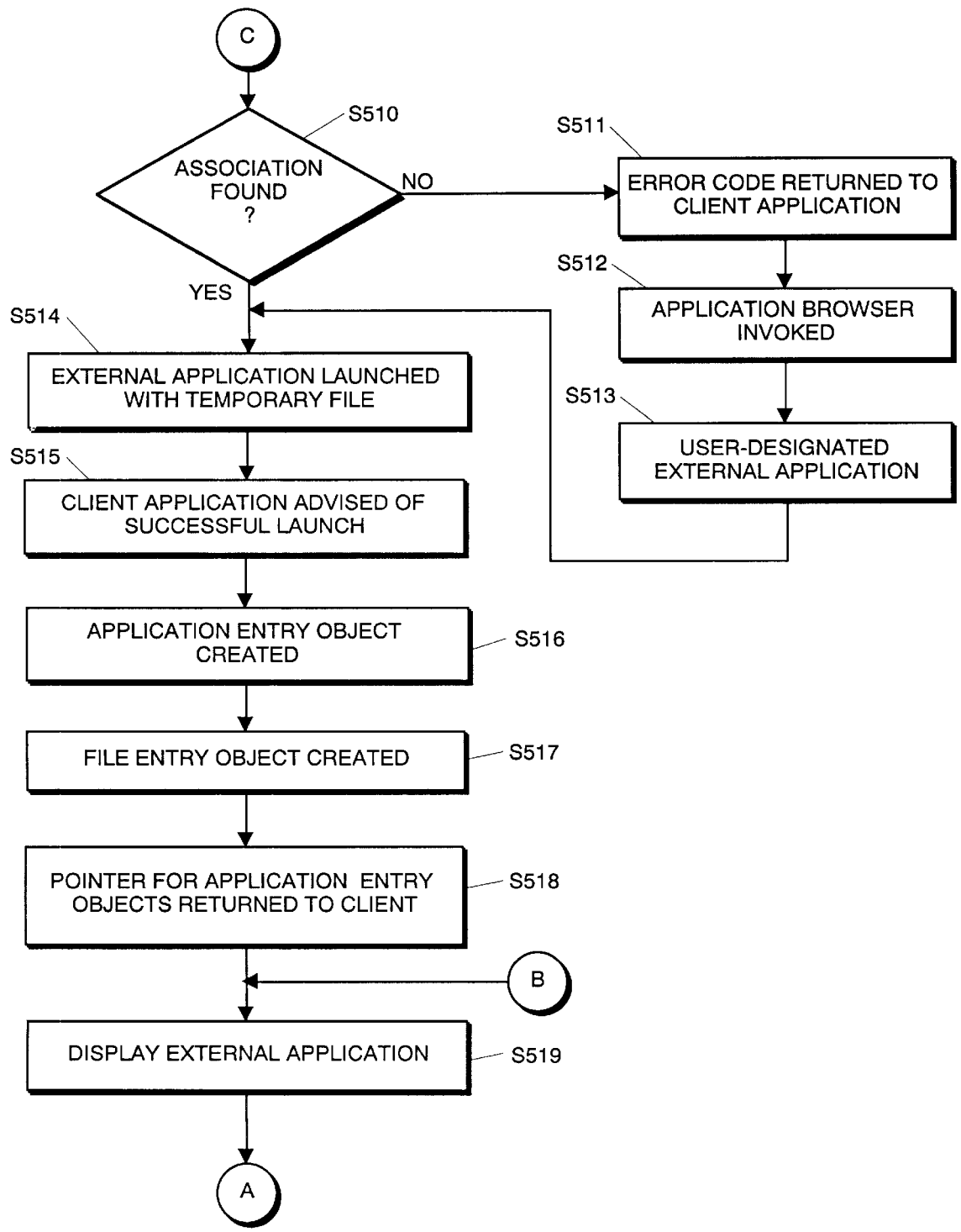

FIG. 5 is a flow diagram illustrating operation of the FIG. 4 managing system. The steps performed in FIG. 5 are executed by CPU 30 in accordance with stored program instruction sequences stored on fixed disk 25 and executed out of random access memory 51.

In step S501, the user activates the client application which, as part of its initialization routine, instantiates the application manager 60 and file manager 70. In step S502, application tracker 62 commences polling of application finder 65 and file tracker 72 to determine the status of any existing external applications as well as whether or not files associated with those external applications have been modified. Polling is described in fuller detail in connection with FIG. 7; for present purposes, it is sufficient to note that polling occurs on a periodic basis which is set to between three and ten seconds.

Figure 6:
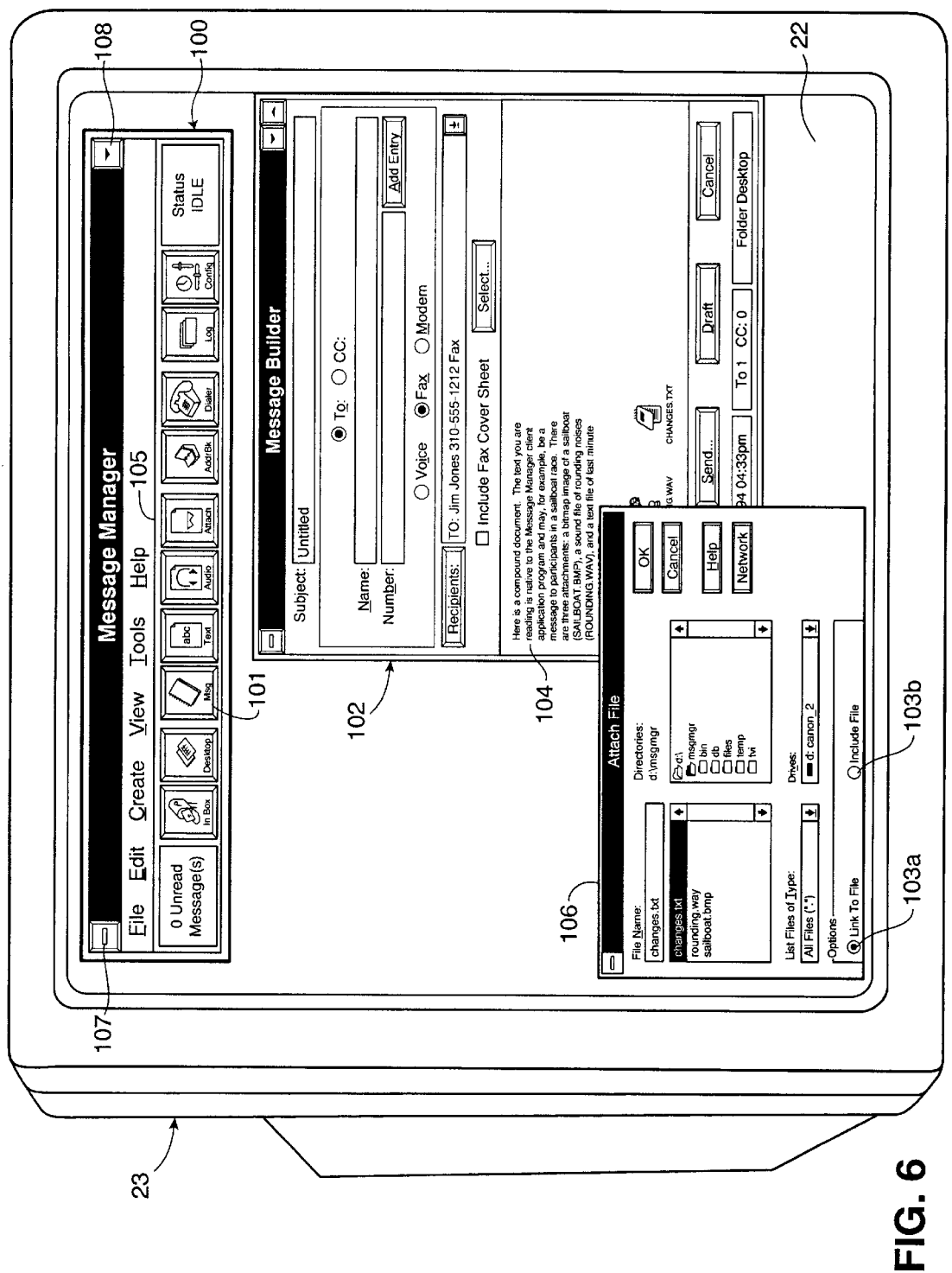
FIG. 6 is an illustrative view of a compound document.

In step S503, the user utilizes client application 55 to create a compound document, such as the compound document shown in FIG. 6. More particularly, in the representative embodiment of the invention described here, the client application is a message manager application program. To build a compound document, the user selects the message builder option button 101 from tool bar 100, which causes the message manager application to display a message builder screen 102. After entering data in the native message manager application mode, the user is permitted to attach documents created by external applications, thereby creating a compound document. In particular, by selecting attach button 105, screen 106 is displayed to allow a user to embed a document or form a link to the document. In the case of embedding a document, a copy of the document is physically created within the compound document, whereas in the case of a linked document, only a link to the external document is stored. The option of linking or embedding is provided by radio button 103a and 103b. After selecting whether to link or to embed the external document, a compound document such as that shown in display area 104 is created.

In step S504, the client application displays the compound document and allows user selection of any external object (or data item) from the compound document. In step S505, in response to user selection of a data item, client application 55 checks if there is a valid pointer, previously supplied from application pool manager 61, for the entry object for this item (S506). If there is a valid pointer, then the user has previously activated this data item and there is a corresponding external application which is present. Accordingly flow branches to step S507 in which client application 55 merely passes the window handle to the windowing operation system which, in turn, puts the external application into focus for use by the user. Flow then advances to step S519 in which the windowing operating system displays a window for the selected external application.

Presumably, however, if this is the first time that the item has been selected by the user, then there is no valid pointer for an entry object for this item. Accordingly, flow continues to step S508 in which the client application creates a temporary file for use by the external application. In more detail, in a case where the item is a linked item, client application 55 simply uses the file designated by the link. If, on the other hand, the selected item is an embedded item, then client application 55 creates a temporary file and stores the embedded data from the compound document into the temporary file. When creating the temporary file, client application 55 maintains the same DOS extension for the file name. As will be seen below, the DOS extension is used as a key to associate particular external application programs with the temporary file. For example, a .BMP extension is presumed to be a bitmap file and an external graphics application such as Microsoft Paint Brush which handles bitmap files, is associated with a .BMP file. Likewise, a .TXT file is presumed to be a text file and a text editor such as Microsoft Note Pad is associated with such a file; and a .WAV file is assumed to be a wave file and a sound editor such as Microsoft Sound Recorder is associated with such a file. Similar associations are well known to those skilled in the art.

In step S509, client application 55 invokes application launcher 64 to determine whether an external application can be associated with the temporary file (or, for a linked item, the linked file). Application launcher 64 inspects the DOS extension of the file name and determines whether an external application can be associated with that DOS extension. In making this determination, application launcher 64 refers to the windowing operating system and, in the case where the windowing operating system cannot return an external application, also refers to initialization files such as .INI files which store such associations. If an association is not found (step S510), then flow advances to step S511 in which application launcher 64 returns an error code to client application 55. Client application 55 then invokes application browser 66 (step S512) which allows a user to make a manual selection of an external application (step S513). The manual selection is returned by application browser 66 to client application 55 which, in turn, returns the manually-selected application to application launcher 64.

In the case where application launcher 64 is able to associate an external application file to the DOS extension, or in the case of manual designation by the user in step S513, application launcher 64 launches the associated external application. For example in the case of a .BMP file, application launcher 64 may launch a Paint Brush application as seen at 87. Similarly, in the case of a .TXT file, application launcher 64 launches a Note Pad application 88; or in the case of a .WAV file, application launcher 64 launches sound recorder external application 89. Application launcher then informs client application 55 that an external application has successfully been launched (step S515).

Upon learning of successful launch of an external application, client application 55 invokes application pool manager 64 to create an application entry object corresponding to the launched application. Application pool manager 61 responds by creating an application entry object such as object 67, 68 or 69, the application entry object being responsible to store information concerning the application. As mentioned previously, one application entry object is created for each existing external application (or in the case where two different files in the same compound document have the same DOS extension, for each separate instance of the external application).

Application pool manager 61 further invokes file pool manager 71 to create a corresponding file entry object (step S517). In like manner to the application pool manager, the file pool manager 71 creates a file entry object, such as object 77, 78 or 79, to track the status of the temporary file with which the newly-launched external application is operating.

Flow then advances to step S518 in which application pool manager returns a pointer to the client application. The pointer is a pointer for the application entry object and the file entry object. The client application 55 is able to use this pointer for future operations, such as in step S506 where the client application determines whether there is a valid pointer signifying that an external application is present for a selected item, or such as described below in connection with closing down or iconizing of client application 55. Flow then advances to step S519 in which the windowing operating system displays a window for the selected external application.

Thereafter, the user is free to use the newly-launched external application to create, edit or otherwise modify the data item from the compound document. In addition, the user is free to switch focus to other windows or to activate new windows. When the user wishes to return to the window corresponding to the external application, he can do so through normal windowing protocol or he may re-select the data item from a compound document displayed by client application 55. In that case flow proceeds as described above in connection with step S506 in which client application 55 determines whether there is a valid pointer for the entry object corresponding to the selected item and in which, in response to a positive identification of such a valid pointer, client application 55 simply passes the window handle to the windowing operating system which executes focus onto the external application.

Figure 7:
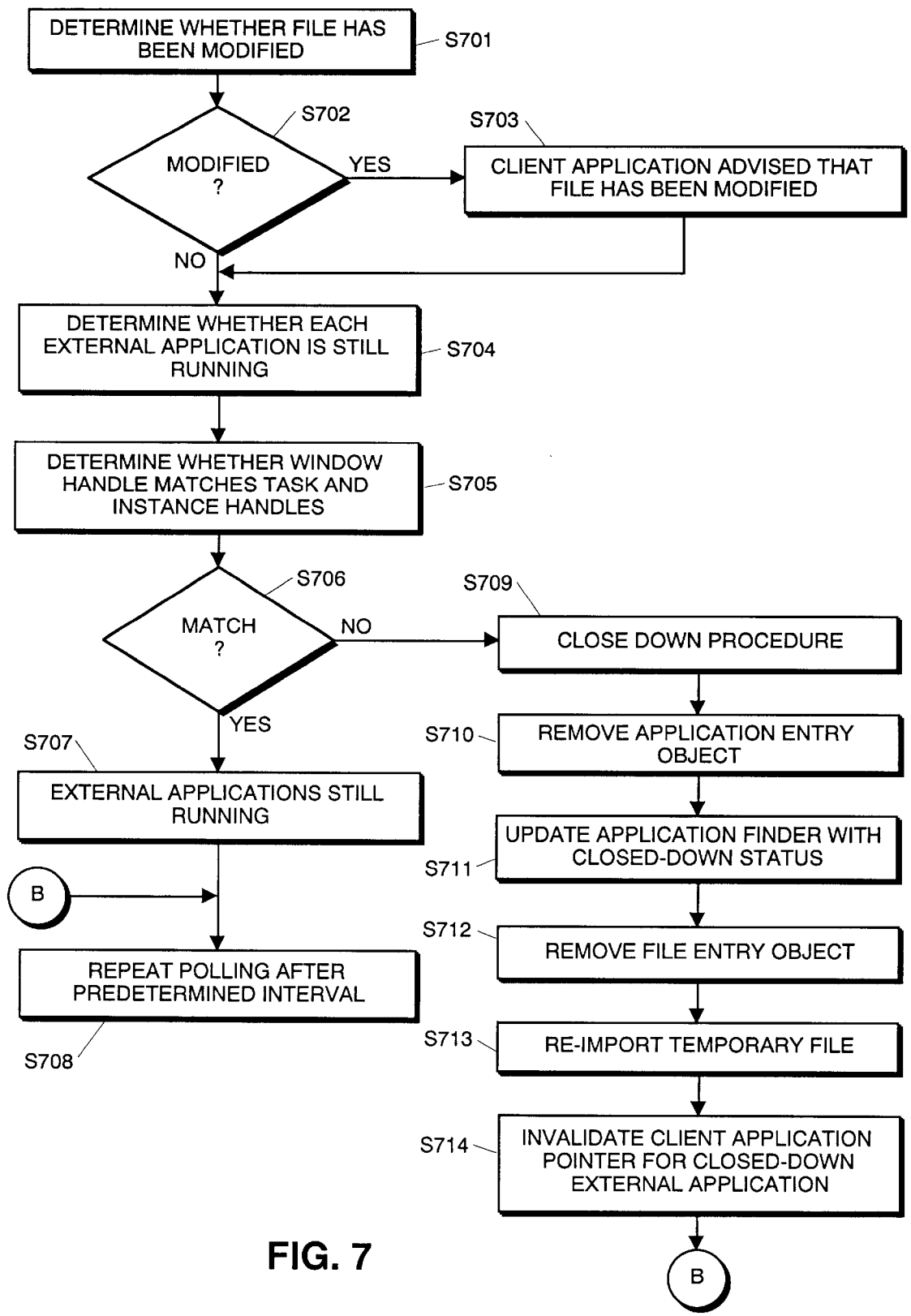
FIG. 7 is a detailed flow diagram showing polling by the application tracker.

FIG. 7 is a detailed flow diagram showing polling by application tracker 62.

In step S701, application tracker 62 invokes file tracker 72 which, via any existing file entry objects, determines whether a file has been modified. If file tracker 72 determines from a file entry object that an external file has been modified (step S702) then flow branches to step S703 in which file tracker 72 advises application tracker 62 that a particular file has been modified. That information is passed from application tracker 62 to application pool manager 61 which, in turn, advises client application 55 that a particular file corresponding to one file entry object has been modified.

In either event, flow advances to step S704 in which application tracker 62 invokes application finder 65 to determine whether each external application corresponding to an application entry object is still present. Using the above-described procedure of matching windows handles and instance handles to task handles, application finder 65 checks to ensure that all external applications corresponding to application entry objects are still present. So long as the tested handle values match (step S706), then application finder 65 determines that each external application is still present and returns that information to application tracker 62 (step S707). Then, after a predetermined period (such as three to ten seconds), application tracker 62 repeats its polling process (step S708).

On the other hand, if in step S706 application finder 65 determines that there is no match for the tested handle values, then application finder 65 concludes that an external application has been closed down. Flow then advances to step S709 in which close down procedures are carried out. Particularly, as shown in step S710, application tracker 62 advises application pool manager to remove an application entry object corresponding to the closed down external application. In step S711, the closed down application entry object updates application finder 65 with its new closed down status and then closes itself down. Then in step S712, application pool manager 61 invokes file pool manager 71 to remove its corresponding file entry object. In response, in step S713, the file entry object (or objects) determines if the temporary file created in step S508 was modified by the external application. If no modification had taken place, then client application 55 simply destroys the temporary file. On the other hand, if modifications have taken place, then client application 55 re-imports the data in the temporary file into its internal compound document In addition, client application 55 updates any parameters affected by the re-imported file, such as parameters giving an indication to the user as to size and/or date of most recent modification of the file. In step S714 application pool manager 61 advises client application 55 that the external application has closed down.

Figure 8:
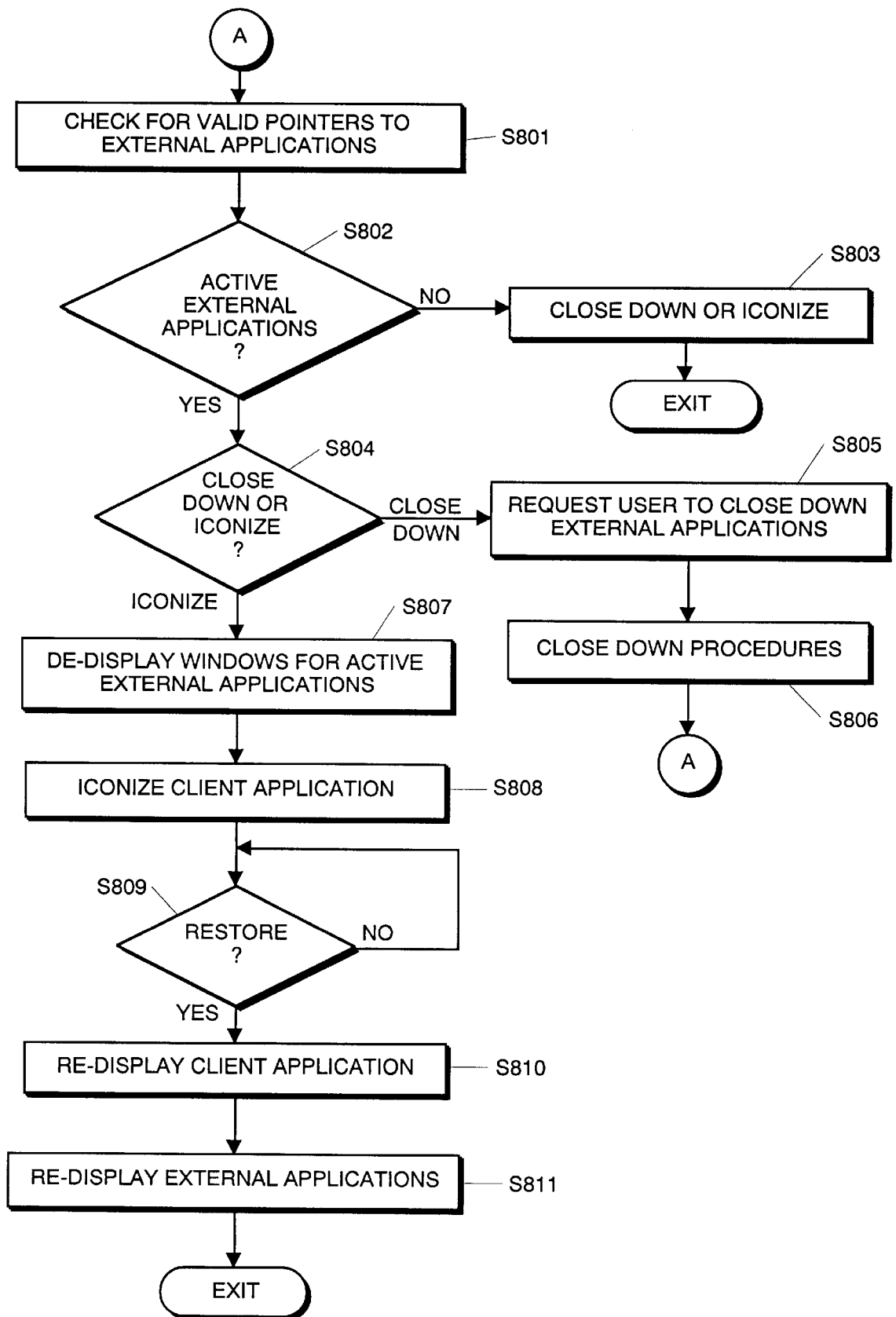
FIG. 8 is a flow diagram showing the procedure for closing down or iconizing a client application.

FIG. 8 is a flow diagram showing the procedure in a case where the user has selected close down or iconization of client application 55. More particularly, as is generally known, it is possible for the user to request the windowing operating system to close down client application 55, for example, by double clicking on control button 107 shown in FIG. 6. Likewise, it is possible for a user to request the windowing operating system to iconize the client application, for example by clicking on minimize button 108. When close down is requested, the windowing operating system exits client application 55 and frees memory previously used by that application. If iconization is selected, the windowing operating system removes all windows associated with client application 55 from display screen 22 and replaces all those windows with an icon representing the client application The user may re-invoke all windows associated with client application 55 by double clicking the application icon.

The flow process shown in FIG. 8 ensures that upon close down or iconization of client application 55, corresponding external applications are closed down in an orderly procedure or swept into the icon for client application 55. More particularly, as shown in step S801, upon user selection of close down or iconization, client application 55 determines whether there are any external applications present. Client application 55 makes this determination by reference to its list of pointers for entry objects which was provided by application pool manager. If no external applications exist (step S802), flow branches to step S803 in which client application 55 is simply closed down or iconized, as requested by the user.

If, on the other hand, there are any existing external applications, then flow advances to step S804 in which, if a close down operation has been requested, flow advances to step S805 where client application 55 requests the user to close down the external applications. A dialog box may be provided to warn the user of the existence of external applications. As each external application is closed down, the close down procedures commencing at step S709 are followed, after which flow advances to step S806 in which client application 55 is closed down.

If step S804 determined that an iconize operation had been requested, then flow advances to step S807 in which client application 55 provides the windowing operating system with the window handle to each external application and requests the windowing operating system to de-display that window. After all external applications have had their windows de-displayed, flow advances to step S808 in which client application 55 is reduced to an icon. In response to a user request to restore client application 55 (step S809) such as by double clicking on the iconic representation of client application 55, the windowing operating system re-displays the client application 55 (step S810). After the client application 55 has been re-displayed, it, in turn, provides the windowing operating system with pointers for all external applications. Using those windows pointers, the windowing operating system re-displays the external applications.

What is claimed is:

1. A computer implemented system for managing an external application in response to user selection of an item in a compound document displayed from a client application, said computer implemented system comprising:

an application manager which receives a file name for an external file corresponding to the item selected from the compound document and which, based on the file name, associates an external application to the external file, launches the external application, repetitively polls for information regarding the external application, and outputs the file name, wherein the information polled for at least includes information concerning existence of the external application; and a file manager, responsive to outputting of the file name from the application manager, which monitors the external file to determine if the external file has been modified by the external application and which returns to the application manager a pointer for the external file;

wherein the application manager returns a pointer for the external application and a pointer for the external file to the client application.

2. A computer implemented system according to claim 1, wherein the client application responds to user selection of an item in the compound document by copying the selected item to a temporary file and by sending the temporary file name to the application manager, and wherein in response to receipt of the pointers from the application manager, the client application instructs a windowing operating system to display a window for the external application.

3. A computer implemented system according to claim 1, wherein the client application responds to user selection of an item in the compound document by determining if a valid pointer for the selected item has been received from the application manager, and wherein in a case where a valid pointer exists the client application instructs a windowing operating system to display a window for the external application, and wherein in a case where a valid pointer does not exist the client application copies the selected item to a temporary file, sends the temporary file name to the application manager, and in response to receipt of a pointer from the application manager, instructs the windowing operating system to display a window for the external application.

4. A computer implemented system according to claim 1, wherein in response to close down of an external application, said application manager invalidates the pointer sent to the client application.

5. A computer implemented system according to claim 1, wherein in response to close down of the client application, the client application inspects valid pointers received from the application manager to determine whether any external applications are still present, and before closing down requests close-down of still-present external applications.

6. A computer implemented system according to claim 1, wherein in response to iconization of the client application, the client application inspects valid pointers received from the application manager to determine whether any external applications are still existing and instructs a windowing operating system to de-display any still-existing external applications before iconization.

7. A computer implemented system according to claim 1, wherein information polled for includes a window handle for the external application and a task handle for the external application, and wherein said application manager determines whether the external application is present by matching the window handle and the task handle against corresponding window and task handles in an entry object for the external application.

8. A computer implemented system according to claim 4, wherein in response to close down of an external application, the external file manager determines whether the external file has been modified, and in a case where the external file has been modified re-imports data from the external file.

9. A computer implemented system according to claim 7, wherein in response to restoration of an iconized client application, the client application inspects valid pointers received from said application manager and instructs the windowing operating system to re-display any still-present external applications.

10. A computer implemented system for managing an external application in response to user selection of an item in a compound document displayed by a client application, said computer implemented system comprising:

a windowing operating system for displaying windows;

a client application, interacting with said windowing operating system which creates, retrieves and stores compound documents and displays compound documents for user selection of an item therein, wherein in response to user selection of an item in the compound document said client application copies the selected item to an external file and outputs an external file name for the external file;

an application manager instantiated by said client application, said application manager including (a) an application tracker which repetitively outputs polling requests to check for existence of previously-launched external applications, (b) an application finder responsive to polling requests from the application tracker which returns to the application tracker information on whether an external application is present, (c) an application pool manager for creating, adding and removing application entry objects, the application pool manager also for receiving the external file name from the client application and outputting it, and for returning a pointer for the external file and the external application to the client application, and (d) an application launcher which associates an external application to the external file name output by said client application and which launches the external application; and a file manager, instantiated by the client application, said file manager including (i) a file tracker responsive to polling requests from the application tracker to check for modification of the external file created by the client application returning information on file modifications to the application tracker, and (ii) a file pool manager for creating, adding and removing a file entry object corresponding to the external file, the file pool manager being responsive to output of the external file name from the application pool manager by creating a file entry object.

11. A computer implemented system according to claim 10, wherein in response to output of the pointer for the external file and external application, the client application instructs the windowing operating system to display a window for the external application.

12. A computer implemented system according to claim 10, wherein the client application responds to user selection of an item in the compound document by determining if a valid pointer for the selected item has been received from the application manager, and wherein in a case where a valid pointer exists the client application instructs a windowing operating system to display a window for the external application.

13. A computer implemented system according to claim 10, wherein in response to close down of an external application, said application manager invalidates the pointer sent to the client application.

14. A computer implemented system according to claim 10, wherein in response to close down of the client application, the client application inspects valid pointers received from the application manager to determine whether any external applications are still present, and before closing down requests close-down of still-present external applications.

15. A computer implemented system according to claim 10, wherein in response to iconization of the client application, the client application inspects valid pointers received from the application manager to determine whether any external applications are still present and instructs a windowing operating system to de-display any still-present external applications before iconization.

16. A computer implemented system according to claim 10, wherein said application finder confirms that an external application is still present by testing the external application window handle, the external application task handle, matching the external application instance handle against the external application window handle, and matching the external application task handle against the external application window handle.

17. A computer implemented system according to claim 10, wherein information polled for includes a window handle for the external application and a task handle for the external application, and wherein said application manager determines whether the external application is present by matching the window handle and the task handle against corresponding window and task handles in an entry object for the external application.

18. A computer implemented system according to claim 13, wherein in response to close down of an external application, the external file manager determines whether the external file has been modified, and in a case where the external file has been modified re-imports data from the external file.

19. A computer implemented system according to claim 15, wherein in response to restoration of an iconized client application, the client application inspects valid pointers received from said application manager and instructs the windowing operating system to re-display any still-present external applications.

20. A computer implemented method for managing an external application in response to user selection of an item in a compound document displayed from a client application, said method comprising the steps of:

instantiating an application manager which repetitive commences polling operations to determine whether previously-launched external applications are present and whether associated external files have been modified;

instantiating a file manager responsive to polling requests from the application manager to determine whether an external file has been modified and to inform the application manager of same;

displaying a compound document from a client application;

responding to user selection of an item in the compound document by creating an external file corresponding to the selected item, outputting a file name corresponding to the selected item to the application manager, associating an external application to the file name, launching the external application, and returning, to the client application, a pointer for the external file and the external application.

21. A method according to claim 20, further comprising the step of responding to receipt of the pointer for the external file and the external application by instructing a windowing operating system to display a window for the external application.

22. A method according to claim 20, wherein said step of responding to user selection of an item in the compound document includes the steps of determining if a valid pointer for the selected item has been received from the application manager, instructing the windowing operating system to display a window for the external application in the case where a valid pointer exists, and sending an external file name to the application manager in a case where a valid pointer does not exist.

23. A method according to claim 20, further comprising the step of responding to close down of the external application by invalidating the pointer sent to the client application.

24. A method according to claim 20, further comprising the steps of responding to close down of the client application by inspecting pointers received from the application manager to determine whether any external applications are still present, and requesting close-down of still-present external applications before closing down the client application.

25. A method according to claim 20, further comprising the steps of responding to iconization of the client application by inspecting the pointers received from the application manager to determine whether any external applications are still present and instructing the windowing operating system to de-display any still-present external applications before iconizing.

26. A computer implemented method according to claim 20, wherein information polled for includes a window handle for the external application and a task handle for the external application, and wherein said application manager determines whether the external application is present by matching the window handle and the task handle against corresponding window and task handles in an entry object for the external application.

27. A method according to claim 23, further comprising the step of re-importing external file data to the compound document in a case where the external file has been modified.

28. A method according to claim 25, further comprising the step of responding to restoration of the iconized client application by inspecting pointers received from the application manager and instructing the windowing operating system to re-display any still-present external applications.

29. An apparatus for managing an external application in response to user selection of an item in a compound document displayed from a client application, said apparatus comprising:
- a display for displaying compound documents and windows corresponding to the client application and external applications;
- a memory for storing program steps corresponding to a windowing operating system which responds to instructions to display the client application and external applications on said display, and for storing program instruction sequences corresponding to the client application; and
- a processor for executing the stored program instruction sequences in said memory,
- wherein said stored program instruction sequences include steps to (a) instantiate an application manager which commences repetitive polling operations to determine whether previously-launched external applications are present and whether associated external files have been modified, (b) instantiate a file manager responsive to polling requests from the application manager to determine whether an external file has been modified and to inform the application manager of same, (c) display a compound document from a client application, and (d) respond to user selection of an item in the compound document by creating an external file corresponding to the selected item, outputting a file name corresponding to the selected item to the application manager, associating an external application to the file name, launching the external application, and returning, to the client application, a pointer for the external file and the external application.

30. An apparatus according to claim 29, wherein said stored program instruction sequences further include steps to respond to receipt of the pointer for the external file and the external application by instructing the windowing operating system to display a window for the external application.

31. An apparatus according to claim 29, wherein said stored program instruction sequences to respond to user selection of an item in the compound document further include steps to determine if a valid pointer for the selected item has been received from the application manager, instruct the windowing operating system to display a window for the external application in the case where a valid pointer exists, and send an external file name to the application manager in a case where a valid pointer does not exist.

32. An apparatus according to claim 29, wherein said stored program instruction sequences further include steps to respond to close down of the external application by invalidating the pointer sent to the client application.

33. An apparatus according to claim 29, wherein said stored program instruction sequences further include steps to respond to close down of the client application by inspecting pointers received from the application manager to determine whether any external applications are still present, and requesting close-down of still-present external applications before closing down the client application.

34. An apparatus according to claim 29, wherein said stored program instruction sequences further include steps to respond to iconization of the client application by inspecting the pointers received from the application manager to determine whether any external applications are still present and instructing the windowing operating system to de-display any still-present external applications before iconizing.

35. An apparatus for managing an external application according to claim 29, wherein information polled for includes a window handle for the external application and a task handle for the external application, and wherein said application manager determines whether the external application is present by matching the window handle and the task handle against corresponding window and task handles in an entry object for the external application.

36. An apparatus according to claim 32, wherein said stored program instruction sequences further include steps to re-import external file data to the compound document in a case where the external file has been modified.

37. An apparatus according to claim 34, wherein said stored program instruction sequences further include steps to respond to restoration of the iconized client application by inspecting pointers received from the application manager and instructing the windowing operating system to re-display any still-present external applications.

38. Computer-executable process steps stored on a computer-readable medium to manage an external application in response to user selection of an item in a compound document displayed from a client application, the process steps including:
- a first instantiation step which instantiates an application manager which commences repetitive polling operations to determine whether previously-launched external applications are present and whether associated external files have been modified;
- a second instantiation step which instantiates a file manager responsive to polling requests from the application manager to determine whether an external file has been modified and to inform the application manager of same;
- a displaying step which displays a compound document from a client application;
- a responding step which responds to user selection of an item in the compound document by creating an external file corresponding to the selected item, outputting a file name corresponding to the selected item to the application manager, associating an external application to the file name, launching the external application, and returning, to the client application, a pointer for the external file and the external application.

39. Computer-executable process steps according to claim 38, further comprising a step which responds to receipt of the pointer for the external file and the external application by instructing a windowing operating system to display a window for the external application.

40. Computer-executable process steps according to claim 38, wherein said responding step includes a determining step which determines if a valid pointer for the selected item has been received from the application manager, instructs the windowing operating system to display a window for the external application in the case where a valid pointer exists, and sends an external file name to the application manager in a case where a valid pointer does not exist.

41. Computer-executable process steps according to claim 38, further comprising a step which responds to close down of the external application by invalidating the pointer sent to the client application.

42. Computer-executable process steps according to claim 38, further comprising a step which responds to close down of the client application by inspecting pointers received from the application manager to determine whether any external applications are still present, and which requests close-down of still-present external applications before closing down the client application.

43. Computer-executable process steps according to claim 38, further comprising a step which responds to iconization of the client application by inspecting the pointers received from the application manager to determine whether any external applications are still present and instructing the windowing operating system to de-display any still-present external applications before iconizing.

44. Computer-executable process steps according to claim 38, wherein information polled for includes a window handle for the external application and a task handle for the external application, and wherein said application manager determines whether the external application is present by matching the window handle and the task handle against corresponding window and task handles in an entry object for the external application.

45. Computer-executable process steps according to claim 43, further comprising a step which responds to restoration of the iconized client application by inspecting pointers received from the application manager and instructing the windowing operating system to re-display any still-present external applications.

46. Computer-executable process steps according to claim 41, further comprising a step which re-imports external file data to the compound document in a case where the external file has been modified.

\* \* \* \* \*

UNITED STATES PATENT AND TRADEMARK OFFICE
CERTIFICATE OF CORRECTION

PATENT NO.   : 5,922,054
DATED        : July 13, 1999
INVENTOR(S)  : Farzad Bibayan It is certified that error appears in the above-identified patent and that said Letters Patent is hereby corrected as shown below:

```
        Column 1, line 18, change "Compound," to
--Compound--.

Column 2, line 12, change "application s " to
--application.--; and
                line 44, delete "a".

Column 6, line 65, change "managers" to
--manager--.

Column 12, line 24, change "claim 7," to --claim
6,--.

Column 14, line 1, change "repetitive" to
--repetitively--; and
                line 38, change "steps" to --step--.
```

Signed and Sealed this

Twenty-first Day of November, 2000

Attest:

Q. TODD DICKINSON

*Attesting Officer*                *Director of Patents and Trademarks*